United States Patent [19]

Mazanec et al.

[11] Patent Number: 5,160,713
[45] Date of Patent: Nov. 3, 1992

[54] PROCESS FOR SEPARATING OXYGEN FROM AN OXYGEN-CONTAINING GAS BY USING A BI-CONTAINING MIXED METAL OXIDE MEMBRANE

[75] Inventors: Terry J. Mazanec, Solon; Louis J. Velenyi, Lyndhurst, both of Ohio

[73] Assignee: The Standard Oil Company, Cleveland, Ohio

[21] Appl. No.: 594,247

[22] Filed: Oct. 9, 1990

[51] Int. Cl.$^5$ .............................................. C01B 13/00
[52] U.S. Cl. ......................................... 423/210; 55/16; 252/373; 423/219; 423/230; 423/239; 423/247; 423/415 A; 423/648.1; 423/242.1; 423/244.01; 423/244.07; 423/437
[58] Field of Search .......................... 55/16; 252/373; 423/210, 219, 230, 239, 244, 247, 415 A, 437 R, 648.1

[56] References Cited

U.S. PATENT DOCUMENTS

| | | |
|---|---|---|
| 3,359,705 | 12/1967 | Mullhaupt .................................. 55/16 |
| 3,509,694 | 5/1970 | Imai et al. .................................. 55/16 |
| 4,092,264 | 5/1978 | Tsang et al. .......................... 423/219 |
| 4,330,633 | 5/1982 | Yoshisato et al. ................... 501/152 |
| 4,571,443 | 2/1986 | DiCosimo et al. .................... 585/428 |

FOREIGN PATENT DOCUMENTS

| | | |
|---|---|---|
| 54-99405 | 8/1979 | Japan . |
| 126502 | 9/1980 | Japan .................................. 423/219 |
| 92103 | 7/1981 | Japan .................................. 55/16 |
| 62-047053 | 10/1987 | Japan . |
| 037576 | 8/1989 | Japan . |

OTHER PUBLICATIONS

Takahashi and Iwahara, "Oxide Ion Conductors Based on Bismuthsesquioxide", *Material Research Bulletin*, vol. 13, pp. 1447–1453 (1978).
Abraham et al, "Phase Transitions and Ionic Conductivity in Bi$_4$V$_2$O$_{11}$ an Oxide with a Layered Structure", *Solid State Ionics*, 28–30, pp. 529–532 (1988).
Takahashi et al, "Synthesis of Bi$_2$(Ca,Sr,Ba)$_3$Fe$_2$O$_x$", *Journal of Ceramics Society, Japances International Edition*, vol. 97, pp. 1288–1291 (1989).
Kruidhof et al, "Thermochemical Stability and Non-stoichiometry of Yttra–Stabilized Bismuth Oxide Solid Solutions", *Solid State Ionics*, 37, pp. 213–215 (1990).
DiCosimo et al, "Oxidative Dehydrodimerization of Propylene Over a Bi$_2$O$_3$–La$_2$O$_3$ Oxide Ion–Conductive Catalyst", *Journal of Catalysis*, 102, pp. 1234–1239 (1986).
Bonanos, "High Oxide Ion Conductivity in Bismuth Uranate, Bi$_2$UO$_6$", *Material Research Bulletin*, vol. 24, pp. 1531–1540 (1989).

*Primary Examiner*—Wayne A. Langel
*Attorney, Agent, or Firm*—Larry W. Evans; John E. Miller

[57] ABSTRACT

Oxygen is separated from an oxygen-containing gas by introducing the gas into a first zone of a gas separation apparatus, the apparatus comprising first and second zones separated by a mixed metal oxide membrane, the membrane having a first surface open to the first zone, a second surface open to the second zone, and an empirical formula of $$BiA_xM_yM'_zO_n$$

where A is at least one of Mg, Ca, Sr, Ba, Y, Th, U, and the lanthanide elements; M is at least one of Sc, Ti, Cr, Mn, Fe, Ni, Cu and Zn; and M' is at least one of Co, Rh, Pd, Pt or Ru. The oxygen separated from the oxygen-containing gas can be recovered from the second surface of the membrane either as molecular oxygen, or it can be reacted with an oxygen-consuming substance, such as a hydrocarbon gas, which can be introduced into the second zone of the separation apparatus and brought in contact with the second surface of the membrane.

40 Claims, 5 Drawing Sheets

PROCESS FOR SEPARATING OXYGEN FROM AN OXYGEN-CONTAINING GAS BY USING A BI-CONTAINING MIXED METAL OXIDE MEMBRANE

BACKGROUND OF THE INVENTION

1. Field of the Invention

This invention relates to a process for separating oxygen from an oxygen-containing gas, such as air. In one aspect, the invention relates to a process in which the oxygen is separated from the oxygen-containing gas by means of a Bi-containing mixed metal oxide membrane. In another aspect, the invention relates to a process for providing an oxygen-consuming substance with oxygen extracted from an oxygen-containing gas by means of a Bi-containing mixed metal oxide membrane.

2. Description of the Prior Art

Bi-containing mixed metal oxide membranes are known. For example, DiCosimo et al. teach in U.S. Pat. No. 4,571,443 a Bi-containing, mixed metal oxide catalyst membrane of the empirical formula $$BiL_aM_bO_x$$

where
L is at least one of Y, V, Nb, Ta, W, Mo, Pb, La, Nd, Sm, Er, Yb, Dy and Gd;
M is at least one of Ca, Ba and Sr;
a is 0-1; and
b is 0-0.1

These catalyst membranes are used to extract oxygen from an oxygen-containing gas, such as air, and deliver it to substrates, such as propylene, which react with the oxygen in the presence of the catalyst membrane to form dimers and other products. However the best oxygen flux reported for these catalyst membranes was 27 milliamperes per square centimeter (27 mA/cm$^2$) at 600° C.

Yoshisato et al. teach in U.S. Pat. No. 4,330,633 a solid electrolyte having electron conductivity and oxide ion conductivity, the electrolyte consisting substantially of
(a) an oxide of cobalt,
(b) an oxide of at least one metal selected from strontium and lanthanum, and
(c) an oxide of at least one metal selected from bismuth and cerium.

The electrolyte is taught as being useful for separating oxygen from a gaseous atmosphere having a high oxygen partial pressure into a gaseous atmosphere having a low oxygen partial pressure. For a sintered body consisting of 25 mol % of cobalt oxide, 32.5 mol % of lanthanum oxide, and 42.5 mol % of bismuth oxide, the oxygen flux at 800° C. was 51 mA/cm$^2$.

Takahashi et al. teach in their article entitled "Oxide Ion Conductors Based on Bismuthsesquioxide", *Materials Research Bulletin*, Vol 13, pp 1447-1453 (1978) oxide ion conductive solid electrolytes based on bismuthsesquioxide. While these materials have high oxide ion conductivity, they are electronic insulators and thus require an external circuit to return electrons to the oxide source.

While these references and others teach various Bi-containing mixed metal oxides, none teach such compositions as having commercially significant oxide ion flux (greater than about 100 mA/cm$^2$), particularly at relatively low temperatures (less than about 900° C.). significant oxide ion flux (greater than about 100 mA/cm$^2$), particularly at relatively low temperatures (less than about 900° C.).

SUMMARY OF THE INVENTION

According to this invention, oxygen is separated from a first oxygen-containing gas by
(A) Feeding the first oxygen-containing gas into a first zone of a gas separation apparatus, the apparatus comprising first and second zones separated by a mixed metal oxide membrane, the membrane having a first surface open to the first zone, a second surface open to the second zone, and an empirical formula of:

$$BiA_xM_yM'_zO_n$$

where
A is at least one of La, U, Th, Ce, Pr, Nd, Pm, Sm, Eu, Gd, Tb, Dy, Ho, Er, Tm, Yb, Lu, Y, Mg, Ca, Sr and Ba;
M is at least one of Sc, Ti, Cr, Mn, Fe, Ni, Cu and Zn;
M' is at least one of Co, Rh, Pd, Pt and Ru;
x and y are individually a number between about 0.01 and about 10;
z is a number of 0 to about 0.2; and
n is a number that satisfies the valence requirements of the other elements present;
the first zone having an equilibrium oxygen partial pressure greater than that of the second zone;
(B) Contacting the first oxygen-containing gas in the first zone of the separation apparatus with the first surface of the membrane such that:
(i) oxygen is extracted from the first oxygen-containing gas at the first surface of the membrane; and
(ii) the extracted oxygen is transported across the membrane, in the form of oxide ions, to the second surface of the membrane; and
(C) Recovering the extracted oxygen from the second surface of the membrane such that a second oxygen-containing gas is produced in the second zone of the separation apparatus.

In one embodiment of this invention, the extracted oxygen is removed from the second surface of the membrane by reaction with an oxygen-consuming substance, such as a hydrocarbon gas, which is present in the second zone of the separation apparatus and is in contact with the second surface of the membrane. In another embodiment of this invention, the extracted oxygen is removed from the second surface of the membrane as molecular oxygen, O$_2$.

The mixed metal oxide membranes used in the process of this invention exhibit unusually high oxygen fluxes at relatively low temperatures. These membranes are prepared by conventional techniques, and exhibit other desirable properties under process conditions, such as good chemical and thermal stability.

DETAILED DESCRIPTION OF THE INVENTION

1. Process Starting Materials

The process of this invention is suitable for separating or extracting oxygen from essentially any oxygen-containing gas. As here used, the term "oxygen-containing gas" includes both gas mixtures where molecular oxygen is admixed with one or more other gases, and reducible oxygen-containing compounds where oxygen is chemically bonded to another element. Air is an example of the former, while water (steam), carbon dioxide, carbon monoxide, sulfur dioxide, sulfur trioxide, and the various nitrogen oxides (e.g. nitrous oxide, nitric oxide, nitrogen dioxide, etc.) are examples of the latter. The oxygen-containing gas can contain components that are not gaseous at normal room temperature and pressure (e.g. water) but are gaseous under more severe conditions (e.g. steam), and the oxygen-containing gas mixture can comprise more than one source of oxide ion, e.g. the gas can comprise molecular oxygen and one or more reducible oxygen-containing compounds such as carbon dioxide, steam, etc.

The amount of oxygen in the first oxygen-containing gas is not critical to the practice of this invention as such, and it can vary as desired. For those applications where the extracted oxygen is to be reacted with an oxygen-consuming substance, such as a hydrocarbon fuel, typically the oxygen-containing gas contains at least about 0.1 mole percent (mol %), preferably at least about 5 mol %, of molecular oxygen. In this application, air is a particularly preferred oxygen-containing gas. If the source of oxygen in these applications is not molecular oxygen but rather an oxygen-containing compound, such as carbon dioxide or steam, then the amount of that source in the oxygen-containing gas will be a function of the desired efficiency of the application. Moreover, the relative ease by which the oxygen-containing compound can be reduced, i.e. prompted to release one or more oxide ions, will influence the choice of oxygen-containing compound to use. In this regard, less energy is required to remove an oxide ion from carbon dioxide than from carbon monoxide and all other factors (e.g. cost, availability, equipment requirements, etc.) being equal, the former would be preferred over the latter.

In those applications where the purpose of separating the oxygen from the oxygen-containing gas is to decrease the amount or eliminate completely the oxygen component, such as removing various nitrogen oxides from a combustion gas, the amount of the oxygen component in the first oxygen-containing gas will be a function of the source of the oxygen component. Depending upon such factors as convenience, economy and the like, the gas may be used as obtained from the source or it may be first diluted or concentrated.

The mix metal oxide membrane used in the process of this invention is at least a four element composition, i.e. a composition containing bismuth, at least one component A, at least one component M and oxygen all in designated, proportional amounts. Preferably, x is a number between about 0.2 and about 5, and y is a number between about 0.2 and about 7. Especially preferred are membranes where x is between about 0.5 and 2, y is between about 0.5 and 3, and z is a number greater than 0, preferably greater than about 0.05.

Certain of the components can be combinations of two or more elements, e.g. A can be a combination of strontium and calcium. In such instances, the subscript value (e.g. x, y, etc.) represents the sum of the elements (e.g. for A, the sum of strontium and calcium is equal to a number which is between about 0.01 and about 10).

Preferred membranes are membranes where A is at least one of Sr, La, Ca, Y, Ba, Ce, U, and Gd, M is at least one of Fe, Cu, Cr and Ni, and M' is at least one of Co, Rh, Pd and Ru. Particularly preferred membranes are where A is at least one of Sr, La, Ca and Ba, M is at least one of Fe, Ni and Cr, and M' is at least one of Co, Ru and Pd.

The exact structure or element arrangement of the membranes are not known but the individual elements are present in the form of a mixed oxide which commonly comprises a pervskite structure or a tetragonally distorted perovskite structure or some combination of both. However, the compositions of the membranes are known not to be a mere physical mixture of the components but rather unique solid phases where the individual components are chemically bonded to one another. Not all membranes separate oxygen equally well from all oxygen-containing gases, but the membranes of this invention do exhibit a selectivity for oxygen over the other elements of the gas.

The membranes used in this invention can be used either alone or with a structural support. If a support is used, it can comprise essentially any material that is inert, porous to oxygen, and retains its physical integrity under the conditions at which the invention is practiced. Representative examples include yttria-stabilized alumina and zirconia, silicon carbide, porous carbon and various polymeric materials. Particularly preferred supports are those comprised of the same materials from which the membrane itself is made but constituted as a porous solid relative to the dense membrane. The membrane can be applied to the support in any conventional manner, and it is provided in a quantity sufficient to effect separation of oxygen from the oxygen-containing gas (typically as a relatively uniform, thin film over the support).

The shape of the membrane (or the support if the membrane is used in combination with a support) is not critical to the practice of this invention, and it can take any shape amenable to the efficient operation of the separation apparatus. Typically, the shape is in the form of a disc or a hollow tube. The dimensions of the membrane can vary to convenience with the understanding that the thickness of the membrane is typically kept to the minimum required for effective separation, structural integrity, and substantial gas-imperviousness to the components of the oxygen-containing gas mixture other than oxygen. "Gas-imperviousness" as here used means substantially gas-tight in that the membrane does not permit a substantial amount of the first oxygen-containing gas (other than the oxygen component in the form of an oxide ion) to pass through the membrane as a gas. If an oxygen-consuming gas is used as a substrate in the second zone of the separation apparatus, the membrane should also be gas-impervious to its components as well as to the second oxygen-containing gas formed from the reaction of the oxygen-consuming substrate with the oxygen on the second surface of the membrane (other than oxygen itself, of course). In some embodiments of this invention, a minor degree of perviousness to gases are acceptable or unavoidable, particularly when hydrogen gas is present.

The membrane can be prepared in any one of a number of different methods, the particular method employed being a matter of convenience. Typically, the membranes are prepared by mixing the desired components in the proper proportions to form a solution or slurry, drying the solution or slurry with or without a reducing agent, calcining the remains of the dried solution or slurry, shaping the product of the calcination, typically with a binder, into the desired shape, and then sintering the shaped, calcined product to the finished membrane. The components employed can be the oxides, halides, nitrates, acetates or other salts of Bi, A, M and M', and particularly preferred is the use of their soluble salts. After the starting ingredients have been combined to form a solution or slurry (with or without the aid of a dispersant, such as citric acid), it is dried and the recovered solid is then heated in the presence of a nonreducing gas, such as air, nitrogen, nitric oxide, etc., at a temperature between about 400° and about 1000° C. After the dried slurry has been calcined, the resulting product is crushed, mixed with a binder (e.g. polyethylene glycol, glycerol, polyvinyl alcohol, starch, etc.), shaped, and then sintered in a nonreducing gas at a temperature between about 700° and about 1100° C. The calcination continues until essentially all of the physically bound water has been removed, and the sintering continues until the shaped body nears its theoretical density. Alternative methods of membrane preparation include vapor deposition, flame spraying, plasma spraying, coprecipitation, oxide or carbonate sintering and other techniques known to those skilled in the art.

If the membrane is used in combination with a support, the calcined, crushed solids either with or without a binder, are applied to the support in any convenient manner and then subjected to sintering.

2. Process Apparatus

The separation apparatus used in the process of this invention comprises a first and second zone separated by the Bi-containing mixed metal oxide membrane of this invention. The membrane forms a substantially gas impervious barrier between the two zones of the separation apparatus, although the configuration of the barrier can vary to convenience. Typically, the apparatus is constructed in such a manner that each zone can be heated, either as a single unit or independent of one another. Zone 1 is equipped with a port through which the oxygen-containing gas can be fed in such a manner that it eventually is in contact with a surface of the membrane that is not in contact with zone 2. Zone 2 is equipped with means by which the oxygen separated from the oxygen-containing gas in zone 1 can be collected for recovery (typically by drawing a full or partial vacuum on zone 2) or can be put to immediate use (typically by reacting with an oxygen-consuming substance). If the oxygen that emerges onto the second surface of the membrane is to be collected, zone 2 can simply be an oxygen impervious chamber from which oxygen recovered from the second surface can be removed conveniently and efficiently. If the oxygen is to be immediately consumed by a substrate, then zone 2 can be configured and equipped in a manner that both maximizes the contact between the substrate and the oxygen present on the second surface of the membrane, and at the same time minimizes the contact between the second oxygen-containing compound and the second surface of the membrane. The use of a sweep gas, i.e. any substantially inert, relatively abundant and inexpensive gas such as nitrogen, argon, helium, etc., can be used to accomplish this end. As here used in reference to the second oxygen-containing gas, "oxygen-containing gas" has the same meaning as when used in reference to the first oxygen-containing gas, i.e. molecular oxygen alone, molecular oxygen in combination with other gases, and reducible oxygen-containing compounds where oxygen is chemically bonded to another element.

Recovering molecular oxygen from the second surface of the membrane and removing it from the second zone by drawing a vacuum on the second zone is an example of the second oxygen-containing gas consisting of simply molecular oxygen. Using a sweep gas, e.g. helium, to recover molecular oxygen from the second surface of the membrane and removing it from the second zone is an example of the second oxygen-containing gas consisting of a gaseous mixture. Water, in the form of steam, is an example of the second oxygen-containing gas comprising a reducible oxygen-containing compound where oxygen is chemically bonded to another element, here the water present in the second zone as a product of a reaction between hydrogen, an oxygen-consuming substrate, and the oxygen present on the second surface of the membrane.

Figure 1:
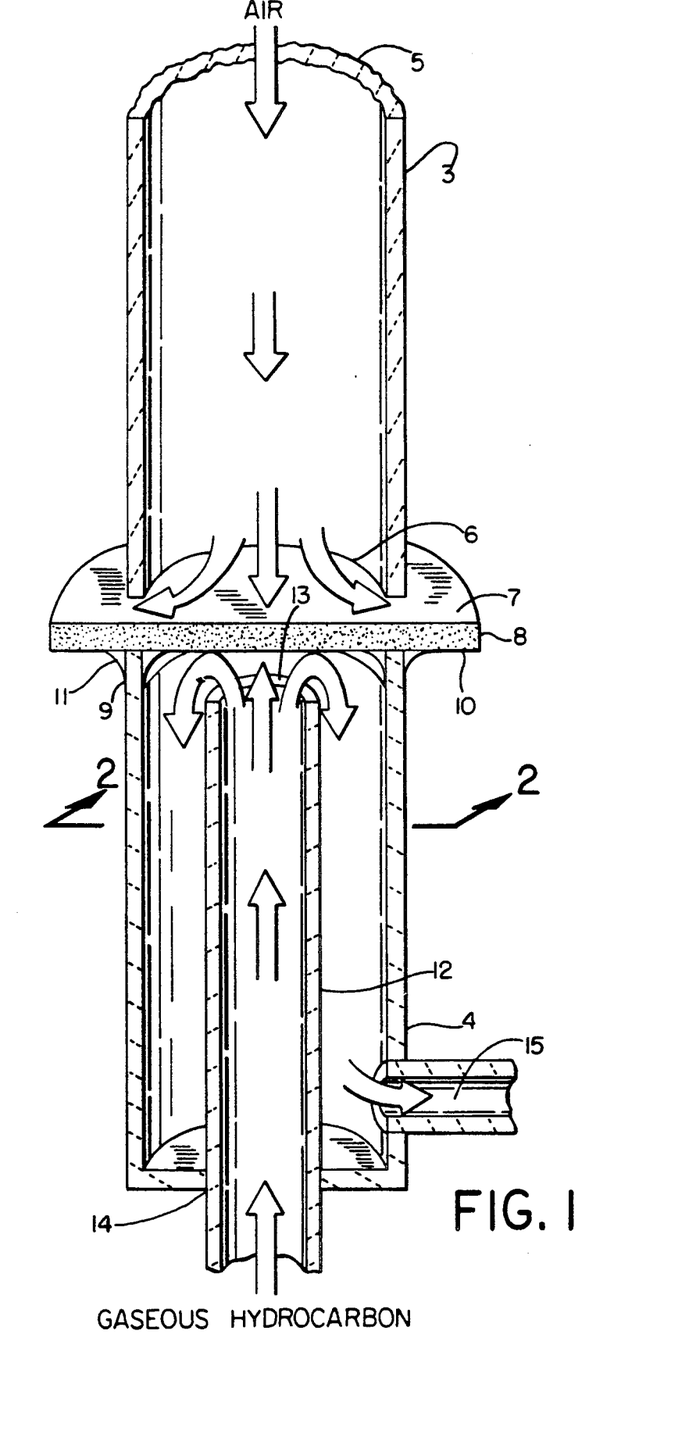
FIG. 1 is a schematic diagram illustrating one embodiment of the separation apparatus in which the mixed metal oxide membrane is used in the form of a disc.
Figure 2:
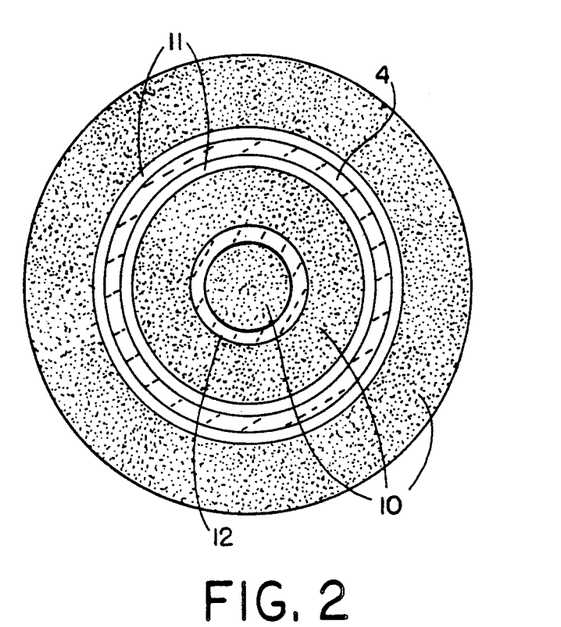
FIG. 2 is a bottom plan view taken along line 2—2 of zone 2 of the separation apparatus illustrated in FIG. 1.

FIG. 1 of the drawings illustrates one embodiment of the separation apparatus used in the process of this invention. Zones 1 and 2 are gas-impervious tubes, 3 and 4 respectively. Tube 3 has open ends 5 and 6 with open end 6 placed in close approximation to first surface 7 of membrane 8 (here illustrated, in lateral cross-section, as a disc slightly larger in diameter than that of tubes 3 and 4). Rim 9 of tube 4 is joined to the second surface 10 of membrane 8 by a seal 11 which renders the junction of rim 9 and second surface 10 gas-impervious. A second, gas-impervious tube 12 of smaller diameter than tube 4 is coaxially fitted within tube 4 such that open end 13 of tube 12 is in close approximation to the second surface of membrane 8. Seal 11 is formed between second surface 10 of membrane 8 and the rim which forms open end 9 of tube 4 such that the area of second surface 10 within the rim of open end 9 is substantially unobstructed with sealant, as depicted in FIG. 2. Tube 12 is fitted within tube 4 to form a gas-impervious seal at juncture 14. The entire apparatus of this FIG. 1 can be enclosed in a gas-impervious housing (not shown), and is typically equipped with heating elements (also not shown) that can independently heat zones 1 and 2.

FIG. 2 is a bottom plan view taken along line 2—2 of zone 2 of the separation apparatus illustrated in FIG. 1. The innermost, circular band is a cross-section of tube 12 which, as described above, is not in contact with second surface 10 of membrane 8. The next concentric circular band out from the innermost circle is a cross-section of seal 11, followed by a cross-section of tube 4, followed by another cross-section of seal 11. The outermost circular band is the outer edge of second surface 10. As this figure illustrates, the surface area of second surface 10 within the circular band formed by the cross-section of seal 11 is unobstructed to the flow of gaseous hydrocarbon exiting tube 12 by open end 13.

In one embodiment of the operation of the separation apparatus depicted in FIG. 1, an oxygen-containing gas, e.g. air, enters open end 5 of tube 3, passes through the length of tube 3, and is discharged through open end 6 of tube 3 such that it makes contact with first surface 7 of membrane 8. Membrane 8 is a bismuth-containing mixed metal oxide of this invention as previously described with a selectivity for oxygen. At or near first surface 7, oxygen is extracted from the oxygen-containing gas as an oxide ion, and transported across membrane 8 to second surface 10 where it is reacted with an oxygen-consuming substance, e.g. a gaseous hydrocarbon. The oxygen-consuming gas is introduced to second surface 10 through tube 12 in such a manner that it also serves as a sweep gas, e.g. nitrogen, argon, helium, etc. The products formed by the reaction of the oxide ion and hydrocarbon are continuously removed from or near second surface 10 and the annular space within tube 4 that is defined by the outer surface of tube 12 and the inner surface of tube 4, by way of tube 15. The air is brought in contact with first surface 7 of membrane 8 in such a manner that the equilibrium oxygen partial pressure of the gas is greater than the equilibrium oxygen partial pressure that exists at or near the second surface 10 within the area defined by seal 11. This difference in equilibrium oxygen partial pressure between zones 1 and 2 can be maintained by any one of a number of different means, but it is typically maintained at a steady state by a constant introduction of the oxygen-containing gas to first surface 7 and the constant consumption of the oxide ion at or near second surface 10 by the oxygen-consuming gas to form a second oxygen-containing gas that is continuously removed from zone 2. "Equilibrium oxygen partial pressure" here means the oxygen pressure calculated at stated conditions when the mixture of components is at thermodynamic equilibrium.

In another embodiment of the operation of the separation apparatus depicted in FIG. 1 modified by the deletion of tube 12 and the conversion of tube 4 (zone 2) into a closed, gas-impervious housing with tube 15 as the only means of exit (other than membrane 8 itself), the oxide ion is recovered from surface 10 in the form of molecular oxygen. A slight vacuum is drawn on zone 2 (by means not shown), and the oxygen is recovered through tube 15.

Figure 3:
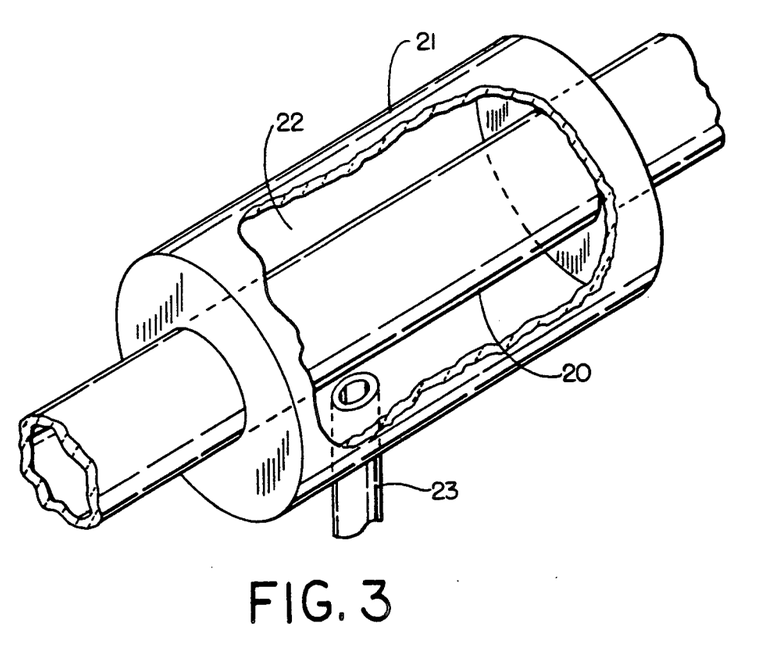
FIG. 3 is a schematic diagram illustrating one embodiment of the separation apparatus in which the mixed metal oxide membrane is used in the form of a hollow tube.

FIG. 3 is a schematic diagram of another embodiment of the separation apparatus. Here, the Bi-containing mixed metal oxide membrane is tube 20 which extends through housing 21 to form chamber 22, a closed space except for its open communication with tube 23. In one mode of operation of this particular separation apparatus, an oxygen-containing gas is fed through the interior of tube 20 (zone 1) under conditions which oxygen is extracted from the oxygen-containing gas on the inner (first) surface of tube 20, transported across the thickness of tube 20 in the form of an oxide ion to the outer (second) surface of tube 20, where it is recovered in the form of molecular oxygen and removed from chamber 22 (zone 2) by way of tube 23. In another mode of operation of this same apparatus, the oxygen-containing gas is fed into chamber 22 (zone 1) by way of tube 23, oxygen is extracted at the outer (first) surface of tube 20, transported across the thickness of tube 20, recovered as molecular oxygen from the inner (second) surface of tube 20, and then removed from the interior of tube 20 (zone 2). Under either mode of operation, the equilibrium oxygen partial pressure zone 1 is greater than the equilibrium oxygen partial pressure of zone 2. Each zone can be heated to the desired temperature by means not shown and but for the membrane itself (tube 20), the remaining pieces of the separation apparatus and the junctures at which they are fitted to one another are substantially gas impervious.

If an oxygen-consuming substrate is used, it is typically a reactant gas. Exemplary reaction gases include hydrogen, carbon monoxide and a hydrocarbon such as ethane, ethylene, propane, propylene, butane, butenes, light naphtha, mixtures of parafins, or mixtures of parafins and olefins, mixtures of olefins, or mixtures of parafins, olefins and aromatics. The reacting gas can also contain inerts or diluents, such as nitrogen or steam, or a recycled product stream.

As noted earlier, oxygen can also be collected and removed from the second surface of the membrane in the absence of an oxygen-consuming substrate, but the effectiveness of this separation will depend upon the oxygen partial pressure difference between the oxygen-containing gas and that of zone 2. The relative pressures of both zone 1 and zone 2 can be subatmospheric, atmospheric or superatmospheric, as long as the oxygen partial pressure of zone 1 is greater than the oxygen partial pressure of zone 2.

The process of this invention can be conducted at any temperature at which the oxygen-containing gas remains in the gaseous state when in contact with the first surface of the membrane. However, since the oxide ion flux of the membrane will vary with temperature and since the flux will usually increase with temperature, preferably the process is conducted at an elevated temperature. The exact temperatures at which zones 1 and 2 of the separation apparatus are maintained will vary with the nature of the oxygen-containing gas, the oxygen-consuming substrate, if any, and the composition of the membrane but where the oxygen-containing gas is air and the oxygen-consuming substrate is a reactant gas, particularly a hydrocarbon, a minimum temperature of about 300° C., preferably about 400° C., is employed in each zone. The maximum temperature of zones 1 and 2 will also vary with the nature of the oxygen-containing gas and oxygen-consuming substrate but where the former is air and the latter is a hydrocarbon, the maximum temperature is typically not greater than about 900° C., and preferably not greater than about 800° C., for each zone.

The following examples are illustrative of certain specific embodiments of this invention. Unless otherwise indicated, all parts and percentages are by mol %.

SPECIFIC EMBODIMENTS

EXAMPLE 1

Ferric nitrate (50.0 g), strontium acetate (25.6 g), bismuth nitrate (60.03 g) and citric acid (35.65 g) were slurried in 500 ml of water and heated to dissolution. The solution was first reduced to near dryness under vacuum on a rotary evaporator, and then to dryness in a vacuum oven. The solids were collected and calcined at 890° C. for two hours in air. The calcined solid was then crushed to fine powder, admixed with 5 wt % Carbowax-20M (a polyethylene glycol) pressed into 34.9 mm diameter discs (1 mm thick), and sintered in air at 970° C. for 17.5 hours. The empirical formula of the discs was $Bi_1 Sr_1 Fe_1 O_x$ with a measured density of 5.66 g/cm$^3$.

One of the discs (#8 in FIG. 1) was then fitted and sealed into a separation apparatus as depicted in FIG. 1. Glass powder from Corning (No. 8161 with a softening point of 600° C.) was mixed with isobutanol to form a thick paste which was then placed on the rim (#9) and outer surface of a mullite tube (#4). The second surface (#10) of the disc was then joined to the mullite tube to form a gas-impervious seal (#11). Another mullite tube (#3) was then positioned such that it was in close proximity to the first surface (#7) of the disc, and the whole apparatus was then placed in an electric furnace (not shown in FIG. 1) and heated to 750° C. over the course of 7½ hours. After holding at this temperature for ½ hour, the temperature was lowered at a constant rate to 550° C. over 6½ hours to obtain a gas tight seal. Air was then passed through mullite tube 3 to the first surface 7 of disc 8, and nitrogen was passed through mullite tube 12 to second surface 10 of disc 8. The temperature was then adjusted to the desired reaction temperature, and the nitrogen was replaced by hydrogen.

The oxygen flux was measured after the separation apparatus reached steady state operation at any given temperature, usually after a minimum of one hour. The gaseous reaction product was cooled to $-78°$ C. to trap water, which was collected and weighed. The dry vent gas composition was analyzed by gas chromatography. The oxygen flux was 269 mA/cm$^2$ at 706° C. after 5 hours of operation and when the temperature was lowered to 457° C., it was 56 mA/cm$^2$ after 11 hours of total operation.

Figure 4:
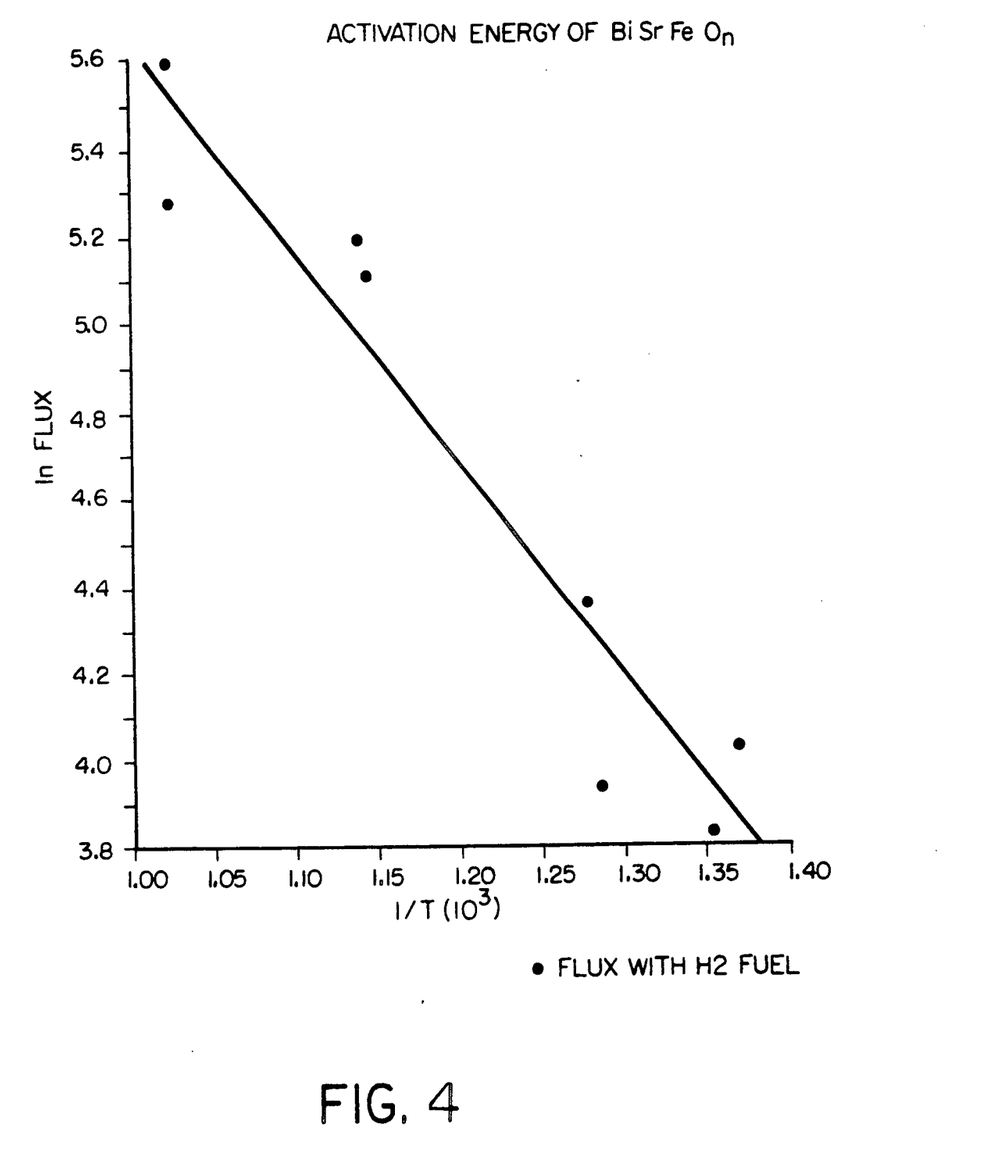
FIGS. 4, 5 and 6 are plots describing the relationship, expressed as the natural log of the flux in mA/cm$^2$ vs. the inverse of temperature in degrees Kelvin, between temperature and oxygen flux of various Bi-containing mixed metal oxide membranes.

FIG. 4 is a plot of these and other data points expressed as the natural log of the flux in mA/cm$^2$ (the ordinate) vs. the inverse of temperature in degrees Kelvin (the abscissa). The data points are expressed in these units because the energy of activation can then be obtained from the slope of the resulting line, which in turn permits the determination of the oxygen flux of the membrane at any temperature. As it clearly demonstrates, the flux of the membrane increases exponentially with an increase in temperature. By way of illustration, following is the calculation for the data point at 457° C., i.e. 56 mA/cm$^2$.

$$mA/cm^2 = \frac{mA}{\pi r^2}$$

where
 r = 0.775 cm, the radius of the disc exposed to H$_2$, and
 mA = cc O$_2 \cdot$S, where $$cc\ O_2 = \left(\frac{I}{J} \cdot R\right) - (F \cdot H \cdot E)$$

where
 I = 0.0434 g of H$_2$O collected over the course of the run,
 J = 1.017 hr, the duration of the run
 R = 11.2, a factor relating g of H$_2$O collected in 1 hr to mols of O$_2$ passed in 1 min.
 S = 267, a factor relating current in mA to cc of O$_2$ passed per min.
 F = 63.5 cc/min H$_2$ gas flow
 H = 0.005 mol % N$_2$ in H$_2$
 E = 0.245, a calibration ratio relating the sensitivity of the gas chromatograph to N$_2$ and O$_2$ The H$_2$ gas flow was measured before the start of the run (i.e. before air was introduced to zone 1). The product gas flow was measured during the run. The product gas was analyzed by gas chromatography to determine mol % nitrogen.

EXAMPLE 2

Figure 5:
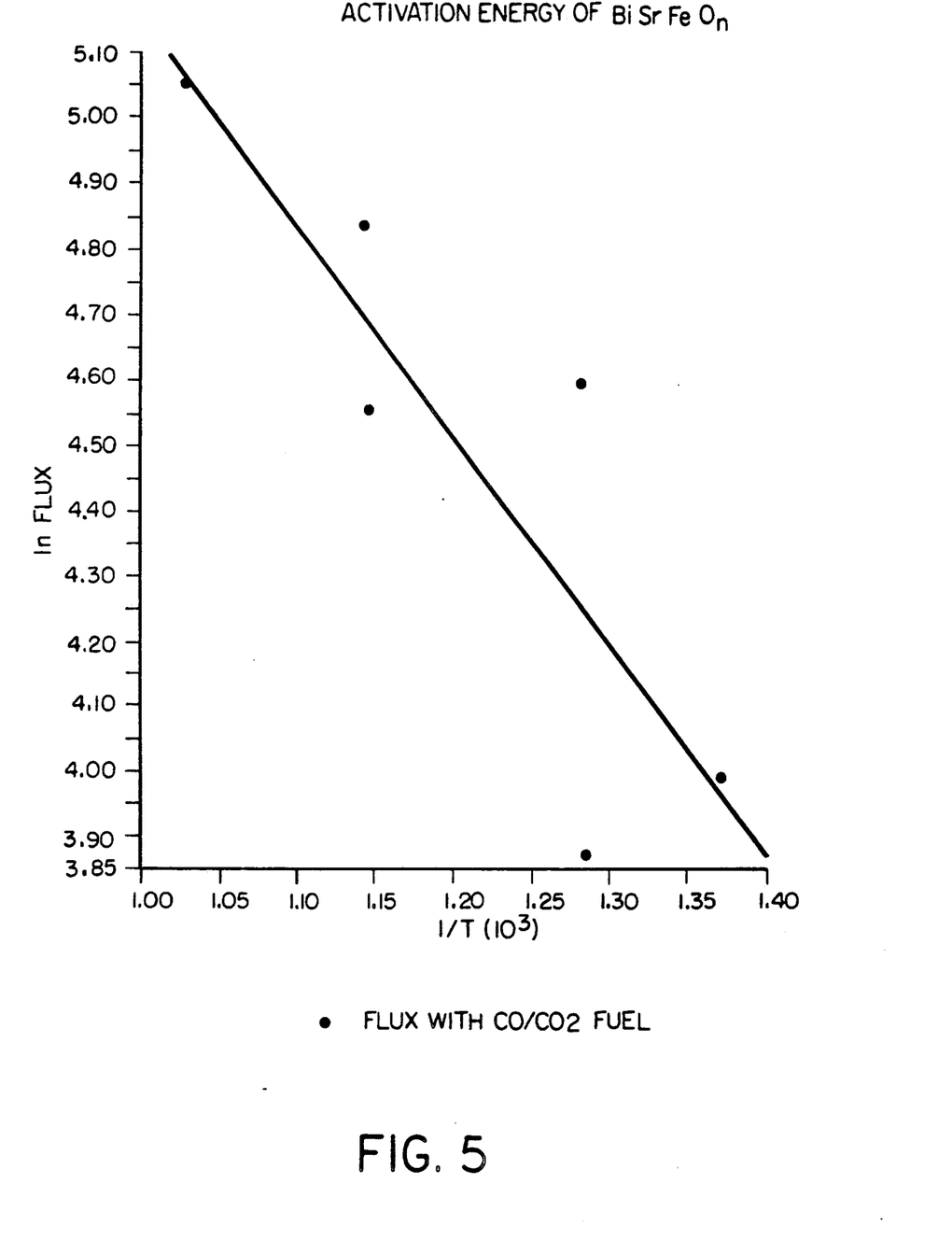

A second disc of the membrane prepared in Example 1 was tested in the apparatus and with the procedure described in Example 1 and at 705° C. with the reactant gas comprising a 90/5/5 composition of carbon monoxide/carbon dioxide/argon, an oxygen flux of 195 mA/cm$^2$ was obtained after 5 hours of operation. At 465° C. and after 11 hours of operation, the oxygen flux was equal to 84 mA/cm$^2$. The density of the disc was 5.70 g/cm$^3$. FIG. 5 is a plot of this and other data points measured and calculated as described for FIG. 4 of Example 1, except the calculation of cc O$_2$ required the use of a different equation. The following calculation of 84 mA/cm$^2$ is illustrative:

$$cc\ O_2 = [(B \cdot K) + (B \cdot L_2)] - [(F \cdot M) + (F \cdot N_2)] - (B \cdot D \cdot E)]$$

where
 B = 62.9 cc/min Product Gas Flow
 K = 5.68 mol % CO$_2$ in Product Gas
 L = 88.64 mol % CO in Product Gas
 F = 62.0 cc/min Fuel Gas Flow
 M = 4.97 mol % CO$_2$ in Fuel Gas
 N = 88.76 mol % CO in Fuel Gas
 D = 0.89 mol % N$_2$ in Product Gas
 E = 0.245, a calibration ratio relating the sensitivity of the gas chromatograph to N$_2$ and O$_2$

EXAMPLE 3

A membrane of the composition Bi$_1$ Sr$_1$ Ca$_1$ Fe$_2$ O$_n$ was prepared from a slurry of nitrates of bismuth (60.0 g), calcium (29.21 g) and iron (99.94 g), and strontium acetate (25.45 g) by the procedure described in Example 1. The solid was collected and then calcined at 820° C. for 16 hours in air. The solid was crushed, pressed into 34.9 mm diameter discs (using 5 wt % Carbowax-20M as a binder) with a thickness of 1 mm and sintered in air at 1010° C. for 15 hours. The density of the disc was 4.83 g/cm$^3$.

The disc was charged to the furnace and sealed with glass as described in Example 1, and the temperature was increased slowly to 650° C. At 650° C., the oxide ion flux was measured at 40 mA/cm$^2$ after 5.5 hours of operation by checking for water formation.

EXAMPLE 4

A mixture of bismuth nitrate (50 g), yttrium nitrate (31.6 g) and cobalt nitrate (5.14 g) was slurried in 500 ml of water with citric acid and as in Example 1, the water was removed under vacuum and then oven dried to leave a solid. The solids were collected and calcined in air at 850° C. for 9 hours. The resulting solid was crushed to a fine powder, pressed into 34.9 mm diameter discs, mixed with 5 wt % Carbowax-20M, and sintered in air for 12 hours at 970° C. The disc had an empirical formula of Bi$_1$ Y$_{0.8}$ CO$_{0.2}$ O$_n$ with a measured density of 7.26 g/cm$^3$.

Figure 6:
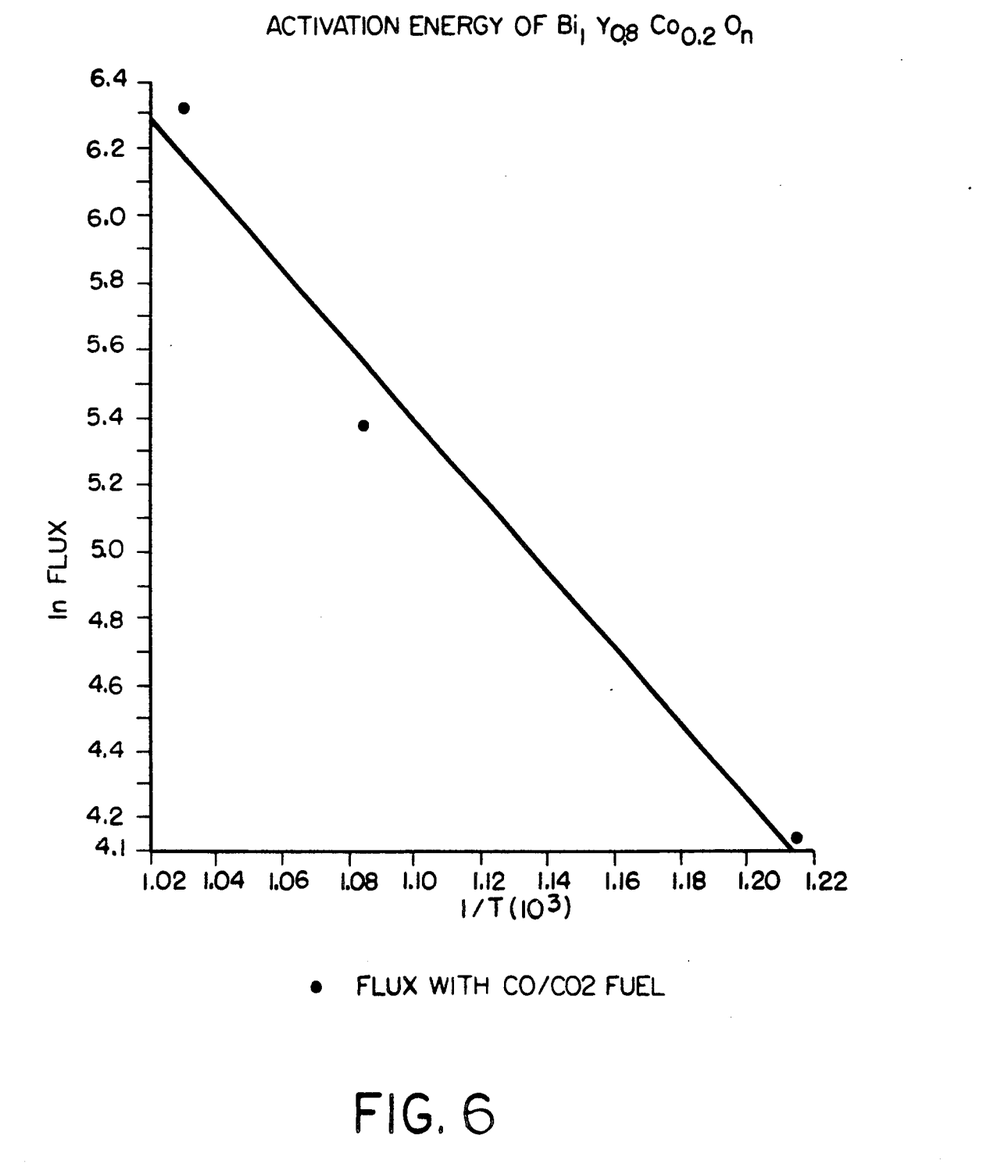

The disc was then sealed into place in the furnace as described in Example 1, and a 90/5/5 carbon monoxide/carbon dioxide/argon mixture was used as the reactant gas. After 2 hours operation at 550° C., the flux was measured at 63 mA/cm$^2$. The temperature was then raised to 700° C. and after 8 hours of operation, the flux was 558 mA/cm$^2$. The temperature was then lowered, this time to 450° C., and the reactant gas switched to hydrogen. After 80 hours of total elapsed time on stream (including time on stream with $CO_2/CO/Ar$ mixture), the flux was 17 $mA/cm^2$. FIG. 6 is a plot of the two $CO/CO_2/Ar$ data points, and another, measured and calculated as described for FIG. 5 of Example 2.

EXAMPLE 5

Bismuth nitrate (76.64 g), ferric nitrate (95.74 g), lanthanum acetate (27.10 g) and strontium acetate (65.0 g) were slurried with citric acid in 500 ml of water. The water was removed under vacuum, the solids dried in an oven, collected and then calcined at 900° C. for 24 hours; the resulting solid crushed to a fine powder, mixed with 5 wt % Carbowax-20M, pressed into 34.9 mm discs, and sintered in air at 1200° C. for 5 hours. The disc which had an empirical formula of $Bi_1 Fe_{1.5} La_{0.5} Sr_2 O_n$ and a density of 6.21 $g/cm^3$, was sealed into the reactor as in Example 1, and tested at 550°–650° C. using the 90/5/5 carbon monoxide/carbon dioxide/argon mixture as a reactant gas. The flux was 12 $mA/cm^2$ at 550° C. after 2 hours of operation, while the highest flux was 39 $mA/cm^2$ at 650° C. after 3 hours of operation.

Although the invention has been described in considerable detail through the preceding Examples, these Examples are for the purpose of illustration only and it is understood that variations and modifications can be made by one skilled in the art without departing from the spirit and scope of the invention.

What is claimed is:

1. A process for separating oxygen from a first oxygen-containing gas, the process comprising:
    (A) Feeding the first oxygen-containing gas into a first zone of a gas separation apparatus, the apparatus comprising first and second zones separated by a mix metal oxide membrane, the membrane having a first surface open to the first zone, a second surface open to the second zone, and an empirical formula of $Bi\ A_xM_yM'_zO_n$ where
    A is at least one of La, U, Th, Ce, Pr, Nd, Pm, Sm, Eu, Gd, Tb, Dy, Ho, Er, Tm, Yb, Lu, Y, Mg, Ca, Sr and Ba;
    M is at least one of Sc, Ti, Cr, Mn, Fe, Ni, Cu and Zn;
    M' is at least one of Co, Rh, Pd, Pt and Ru;
    x and y are individually a number between about 0.01 and about 10;
    z is a number of 0 to about 0.2; and
    n is a number that satisfies the valence requirements of the other elements present;
    the first zone having an equilibrium oxygen partial pressure greater than that of the second zone;
    (B) Contactiong the first oxygen-containing gas in the first zone of the separation apparatus with the first surface of the membrane such that:
        (i) oxygen is extracted from the first oxygen-containing gas at the first surface of the membrane; and
        (ii) the extracted oxygen is transported across the membrane, in the form of oxide ions, to the second surface of the membrane; and
    (C) Reacting the extracted oxygen present on the second surface of the membrane with an oxygen-consuming substance that is present in the second zone and is in contact with the second surface of the membrane.

2. The process of claim 1 where x is a number between about 0.2 and about 5, and y is a number between about 0.2 and about 7.

3. The process of claim 1 where x is a number between about 0.5 and about 2, y is a number between about 0.5 and about 3, and z is a number greater than 0.

4. The process of claim 2 where A is at least one of La, Ca, Y, Ba, Ce, U and Gd, M is at least one of Fe, Cu, Cr and Ni, and M' is at least one of Co, Rh, Pd and Ru.

5. The process of claim 2 where A is at least one La, Ca and Ba, M is at least one of Fe, Ni and Cr, and M' is at least one of Co, Ru and Pd.

6. The process of claim 4 where at least a portion of the oxygen in the first oxygen-containing gas is molecular oxygen.

7. The process of claim 4 where the first oxygen-containing gas comprises at least one of air, sulfur dioxide and a nitrogen oxide.

8. The process of claim 4 where the first oxygen-containing gas comprises air.

9. The process of claim 7 where the oxygen-consuming substance comprises at least one of hydrogen gas, a hydrocarbon gas, and a gaseous carbon monoxide/carbon dioxide mixture.

10. The process of claim 7 where the membrane is used in the absence of a support.

11. The process of claim 7 where the membrane is used in combination with a support.

12. The process of claim 9 or 10 where the temperature of each zone is between about 300° and about 900° C.

13. The process of claim 9 or 10 where the temperature of each zone is between about 400° and about 800° C.

14. The process of claim 9 or 10 where the second oxygen-containing gas is removed from the second zone by a sweep gas.

15. The process of claim 1 where the extracted oxygen is recovered from the second surface of the membrane in the form of molecular oxygen.

16. The process of claim 15 where x is a number between about 0.2 and about 5, and y is a number between about 0.2 and about 7.

17. The process of claim 15 where x is a number between about 0.5 and about 2, y is a number between about 0.5 and about 3, and z is a number greater than 0.

18. The process of claim 16 where A is at least one of La, Ca, Y, Ba, Ce, U and Gd, M is at least one of Fe, Cu, Cr and Ni, and M' is at least one of Co, Rh, Pd and Ru.

19. The process of claim 16 where A is at least one of La, Ca and Ba, M is at least one of Fe, Ni and Cr, and M' is at least one of Co, Ru and Pd.

20. The process of claim 18 where the first oxygen-containing gas comprises molecular oxygen.

21. The process of claim 18 where the first oxygen-containing gas comprises at least one of air, sulfur dioxide, and a nitrogen oxide.

22. The process of claim 21 where the membrane is used in the absence of a support.

23. The process of claim 21 where the membrane is used in combination with a support.

24. The process of claim 21 where the temperature of zone 1 is between about 300° and about 900° C.

25. The process of claim 21 where the temperature of zone 1 is between about 400° and about 800° C.

26. The process of claim 24 where the molecular oxygen in the second zone is removed by drawing a vacuum on the second zone.

27. A process for reacting a hydrocarbon gas with oxygen, the process comprising:
(A) Feeding a first oxygen-containing gas into a first zone of a gas separation apparatus, the apparatus comprising first and second zones separated by a mixed metal oxide membrane, the membrane having a first surface open to the first zone, and a second surface open to the second zone, and an empirical formula of $$BiA_xM_yM'_zO_n$$

where
A is at least one of La, U, Th, Ce, Pr, Nd, Pm, Sm, Eu, Gd, Tb, Dy, Ho, Er, Tm, Yb, Lu, Y, Mg, Ca and Ba;
M is at least one of Sc, Ti, Cr, Mn, Fe, Ni, Cu and Zn;
M' is at least one of Co, Rh, Pd, Pt and Ru;
x and y are individually a number between about 0.01 and about 10;
z is a number of 0 to about 0.2; and
n is a number that satisfies the valance requirements of the other elements present;
the first zone having an equilibrium oxygen partial pressure greater than that of the second zone;
(B) Contacting the first oxygen-containing gas in the first zone of the separation apparatus with the first surface of the membrane such that:
(i) oxygen is extracted from the first oxygen-containing gas at the first surface of the membrane; and
(ii) the extracted oxygen is transported across the membrane, in the form of oxide ions, to the second surface of the membrane; and
(C) Contacting the extracted oxygen present on the second surface of the membrane with the hydrocarbon gas which is present in the second zone and is in contact with the second surface of the membrane such that the extracted oxygen and hydrocarbon gas react to form a second oxygen-containing gas.

28. The process of claim 27 where x is a number between about 0.2 and about 5, and small y is a number between about 0.2 and about 7.

29. The process of claim 27 where x is a number between about 0.5 and about 5, small y is a number between about 0.5 and about 3, and z is a number greater than 0.

30. The process of claim 28 or 29 where A is at least one of La, Ca, Y, Ba, Ce, U and Gd, M is at least one of Fe, Cu, Cr and Ni, and M' is at least one of Co, Rh, Pd and Ru.

31. The process of claim 28 or 29 where A is at least one of La, Ca, and Ba, M is at least one of Fe, Ni and Cr, and M' is at least one of Co, Ru and Pd.

32. The process of claim 30 where the first oxygen-containing gas comprises at least one of air, sulfur dioxide, and a nitrogen oxide.

33. The process of claim 30 where the first oxygen-containing gas comprises air.

34. The process of claim 32 where the hydrocarbon gas is at least one of ethane, ethylene, propane, propylene, butane, butenes, light naphtha, mixtures of paraffins, mixtures of paraffins and olefins, mixtures of paraffins, olefins and aromatics, and aromatics.

35. The process of claim 34 where the membrane is used in the absence of support.

36. The process of claim 34 where the temperature of each zone is between about 300° and about 900° C.

37. The process of claim 34 where the temperature of each zone is between about 400° and about 800° C.

38. The process of claim 37 where the second oxygen-containing gas is removed from the second zone by a sweep gas.

39. A process for separating oxygen from a first oxygen-containing gas, the process comprising:
(A) Feeding the first oxygen-containing gas into a first zone of a gas separation apparatus, the apparatus comprising first and second zones separated by a mixed metal oxide membrane, the membrane having a first surface open to the first zone, a second surface open to the second zone, and an empirical formula of $$BiA_xM_yM'_zO_n$$

where
A is at least one of La, U, Th, Ce, Pr, Nd, Pm, Sm, Eu, Gd, Tb, Dy, Ho, Er, Tm, Yb, Lu, Y, Mg, Ca, Sr, and Ba;
M is at least one of Sc, Ti, Cr, Mn, Fe, Ni, Cu and Zn;
M' is at least one of Co, Rh, Pd, Pt and Ru;
x and y are individually a number between about 0.01 and about 10;
z is a number of greater than 0 to about 0.2; and
n is a number that satisfies the valence requirements of the other elements present;
the first zone having an equilibrium oxygen partial pressure greater than that of the second zone;
(B) Contacting the first oxygen-containing gas in the first zone of the separation apparatus with the first surface of the membrane such that:
(i) oxygen is extracted from the first oxygen-containing gas at the first surface of the membrane; and
(ii) the extracted oxygen is transported across the membrane, in the form of oxide ions, to the second surface of the membrane; and
(C) Reacting the extracted oxygen present on the second surface of the membrane with an oxygen-consuming substance that is present in the second zone and is in contact with the second surface of the membrane.

40. A process for reacting a hydrocarbon gas with oxygen, the process comprising:
(A) Feeding a first oxygen-containing gas into a first zone of a gas separation apparatus, the apparatus comprising first and second zones separated by a mixed metal oxide membrane, the membrane having a first surface open to the first zone, a second surface open to the second zone, and an empirical formula of $$BiA_xM_yM'_zO_n$$

where
A is at least one of La, U, Th, Ce, Pr, Nd, Pm, Sm, Eu, Gd, Tb, Dy, Ho, Er, Tm, Yb, Lu, Y, Mg, Ca, Sr, and Ba;

M is at least one of Sc, Ti, Cr, Mn, Fe, Ni, Cu and Zn;

M' is at least one of Co, Rh, Pd, Pt and Ru;

x and y are individually a number between about 0.01 and about 10;

z is a number of greater than 0 to about 0.2; and n is a number that satisfies the valence requirements of the other elements present;

the first zone having an equilibrium oxygen partial pressure greater than that of the second zone;

(B) Contacting the first oxygen-containing gas in the first zone of the separation apparatus with the first surface of the membrane such that:

(i) oxygen is extracted from the first oxygen-containing gas at the first surface of the membrane; and (ii) the extracted oxygen is transported across the membrane, in the form of oxide ions, to the second surface of the membrane; and (C) Contacting the extracted oxygen present on the second surface of the membrane with the hydrocarbon gas which is present in the second zone and is in contact with the second surface of the membrane such that the extracted oxygen and hydrocarbon gas react to form a second oxygen-containing gas.

* * * * *

UNITED STATES PATENT AND TRADEMARK OFFICE
CERTIFICATE OF CORRECTION

PATENT NO. : 5,160,713
DATED : November 3, 1992
INVENTOR(S) : Terry J. Mazanec and Louis J. Velenyi It is certified that error appears in the above-identified patent and that said Letters Patent is hereby corrected as shown below:

Column 11, claim 1, line 46, delete "Sr".

Signed and Sealed this

Fifteenth Day of February, 1994

Attest:

BRUCE LEHMAN

Attesting Officer                    Commissioner of Patents and Trademarks

UNITED STATES PATENT AND TRADEMARK OFFICE
CERTIFICATE OF CORRECTION

PATENT NO. : 5,160,713
DATED : November 3, 1992
INVENTOR(S) : Terry J. Mazanec and Louis J. Valenyi It is certified that error appears in the above-indentified patent and that said Letters Patent is hereby corrected as shown below:

Column 11, claim 1, line 57, change "Contactiong" to "Contacting".

Signed and Sealed this

Third Day of May, 1994

Attest:

BRUCE LEHMAN

Attesting Officer          Commissioner of Patents and Trademarks